(12) United States Patent  
Knijnenburg et al.

(10) Patent No.: US 9,053,345 B2  
(45) Date of Patent: Jun. 9, 2015

(54) COMPUTING SYSTEM WITH PRIVACY MECHANISM AND METHOD OF OPERATION THEREOF

(71) Applicant: Samsung Electronics Co., Ltd., Gyeonggi-Do (KR)

(72) Inventors: Bart Piet Knijnenburg, Irvine, CA (US); Hongxia Jin, San Jose, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 78 days.

(21) Appl. No.: 13/896,030

(22) Filed: May 16, 2013

(65) Prior Publication Data

US 2014/0082740 A1    Mar. 20, 2014

Related U.S. Application Data

(60) Provisional application No. 61/702,717, filed on Sep. 18, 2012.

(51) Int. Cl.
G06F 21/62 (2013.01)
G06F 21/55 (2013.01)

(52) U.S. Cl.
CPC ............ *G06F 21/6263* (2013.01); *G06F 21/62* (2013.01); *G06F 21/552* (2013.01); *G06F 2221/2101* (2013.01)

(58) Field of Classification Search
CPC . G06F 21/6245; G06F 21/6254; G06F 21/30; G06F 21/31; G06F 21/50; G06F 21/53; G06F 21/62; G06F 21/552; G06F 2221/2101; G06F 21/566; G06F 21/6263
USPC ........................ 726/26–30; 713/165–166, 193
See application file for complete search history.

(56) References Cited

U.S. PATENT DOCUMENTS

| | | | |
|---|---|---|---|
| 7,234,065 B2* | 6/2007 | Breslin et al. ................ 713/193 |
| 7,406,436 B1* | 7/2008 | Reisman ...................... 705/7.32 |
| 8,326,694 B2 | 12/2012 | Patel et al. |
| 8,763,071 B2* | 6/2014 | Sinha et al. ...................... 726/1 |
| 2002/0010625 A1 | 1/2002 | Smith et al. |
| 2002/0024532 A1 | 2/2002 | Fables et al. |
| 2007/0005449 A1 | 1/2007 | Bazlen et al. |
| 2010/0228715 A1 | 9/2010 | Lawrence |
| 2012/0131482 A1 | 5/2012 | Dawson et al. |
| 2013/0006748 A1 | 1/2013 | Horvitz et al. |
| 2013/0298247 A1* | 11/2013 | Laurila et al. .................. 726/26 |

OTHER PUBLICATIONS

Benisch, M., et al., "Capturing location-privacy preferences: quantifying accuracy and user-burden tradeoffs." Personal Ubiquitous Computing 15, (2011), 679-694.

Tang, K., Hong, J., and Siewiorek, D. The Implications of Offering More Disclosure Choices for Social Location Sharing. Proc. CHI 2012, May 5-10, ACM Press (2012), 391-394, Austin, Texas.

* cited by examiner

*Primary Examiner* — Hosuk Song

(74) *Attorney, Agent, or Firm* — IP Investment Law Group

(57) ABSTRACT

A computing system includes: an initialization module configured to generate initial sharing options; a rating analysis module, coupled to the initialization module, configured to generate a privacy score and a benefit score with a control unit for one or more of the initial sharing options; a mapping module, coupled to the rating analysis module, configured to generate a map based on the initial sharing options, the privacy score, and the benefit score; and a tuning module, coupled to the mapping module, configured to: analyze an initial distribution of the map, and generate the tuned sharing options based on the initial distribution for displaying on a device.

30 Claims, 9 Drawing Sheets

COMPUTING SYSTEM WITH PRIVACY MECHANISM AND METHOD OF OPERATION THEREOF

CROSS-REFERENCE TO RELATED APPLICATION

This application claims the benefit of U.S. Provisional Patent Application Ser. No. 61/702,717 filed Sep. 18, 2012, and the subject matter thereof is incorporated herein by reference thereto.

TECHNICAL FIELD

An embodiment of the present invention relates generally to a computing system, and more particularly to a system for privacy.

BACKGROUND

Modern consumer and industrial electronics, such as computing systems, televisions, tablets, cellular phones, portable digital assistants, projectors, and combination devices, are providing increasing levels of functionality to support modern life. In addition to the explosion of functionality and proliferation of these devices into the everyday life, there is also an explosion of data and information being created, transported, consumed, and stored.

Personalization is one mechanism to bring the right information to the right user despite the explosion of data. Personalization is most effective when the user shares information about oneself such that a provider can provide meaningful and contextual information to that user. However, sharing one's information often brings up privacy concerns. Research and development for handling privacy for personalization in existing technologies can take a myriad of different directions.

Thus, a need still remains for a computing system with privacy mechanism balancing the user's concern for privacy while providing enough information to receive an acceptable benefit for sharing personal information. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a computing system, including: an initialization module configured to generate initial sharing options; a rating analysis module, coupled to the initialization module, configured to generate a privacy score and a benefit score with a control unit for one or more of the initial sharing options; a mapping module, coupled to the rating analysis module, configured to generate a map based on the initial sharing options, the privacy score, and the benefit score; and a tuning module, coupled to the mapping module, configured to: analyze an initial distribution of the map, and generate the tuned sharing options based on the initial distribution for displaying on a device.

An embodiment of the present invention provides a method of operation of a computing system including: generating initial sharing options; generating a privacy score and a benefit score with a control unit for one or more of the initial sharing options; generating a map based on the initial sharing options, the privacy score, and the benefit score; analyzing an initial distribution of the map; and generating tuned sharing options based on the distribution for displaying on a device.

An embodiment of the present invention provides a non-transitory computer readable medium including: generating initial sharing options; generating a privacy score and a benefit score with a control unit for one or more of the initial sharing options; generating a map based on the initial sharing options, the privacy score, and the benefit score; analyzing an initial distribution of the map; and generating tuned sharing options based on the distribution for displaying on a device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
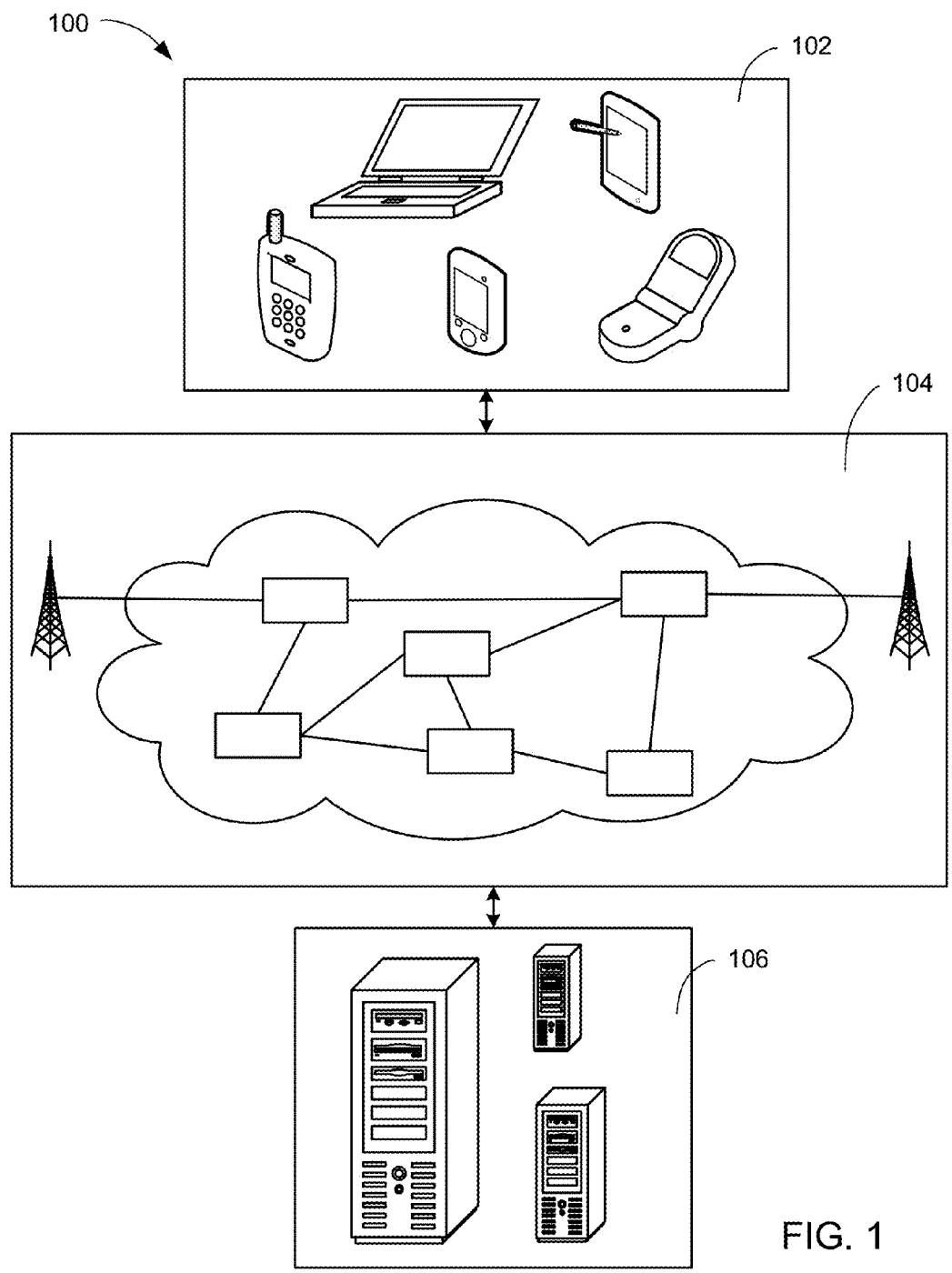
FIG. 1 is a computing system with privacy mechanism in an embodiment of the present invention.

Sharing personal information, such as location-sharing services, allow users to share their location with their friends and colleagues, or even with businesses in return for local deals. To alleviate privacy concerns, users of such services typically want to control what they share with whom and when using a sharing profile. This profile provides the opportunity to select per individual, per time/location, what should be shared.

"What can be shared" can be done very coarsely or with a high level of granularity. Very coarsely can refer to only allowing the user to share their exact location or nothing at all, as an example. A high level of granularity can refer to, as an example, providing numerous sharing options in between the very coarse options, such as sharing one's city or one's city block.

If only given a few coarse-grained options, users can think they are not given enough control on their data sharing; and they might tend to "err on the safe side" (and willing to disclose less information). If given many finer-grained sharing options, users can be burdened with selecting and managing such policies and not necessarily increase the amount of sharing either. Also service providers may prefer users to disclose certain types of information.

Designing a good combination of sharing options is challenging and can determine if personalization if effective or not depending on the willingness for the user to share personal invention or not. As an example, it is important for location-sharing service providers in order to make sure that users have the control of their data sharing and are comfortable disclosing information to get service benefits. The disclosure of the information allow for service providers to get good adoption of their services when the service providers obtain the preferred data from user in order to provide good services. The embodiment of the present invention provides a set of sharing options to show to the users of the services to achieve these goals.

The amount of sharing by adding or removing an option to the current set of options, for this example the initial sharing options, depends on how people perceive the sharing option in terms of the expected benefits and privacy threats that it may cause. The map and the distribution of the sharing options relative to the privacy ratings and the benefit ratings provide an example of what happens when a sharing option is added or removed depending on how close users perceive the added or removed option to be with respect to the other options.

For instance, if users who choose to share their city believe that this option is similar to sharing nothing, they will choose to share nothing when the city option is removed (and some will choose the city option instead of sharing nothing when the city option is introduced). But if they believe that the city option is more like sharing their city block, they will choose to share their city block when the city option is removed (and some will choose the city option instead of the city block option when the city option is introduced). They thus do not necessarily "err on the safe side", and therefore more sharing options is not always better.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a computing system 100 with privacy mechanism in an embodiment of the present invention. The computing system 100 includes a first device 102, such as a client or a server, connected to a second device 106, such as a client or server. The first device 102 can communicate with the second device 106 with a communication path 104, such as a wireless or wired network.

Users of the first device 102, the second device 106, or a combination thereof can communicate with each other or access or create information including text, images, symbols, location information, and audio, as examples. The users can be individuals or enterprise companies. The information can be created directly from a user or operations performed on these information to create more or different information.

In the connected world, information creation, transmission, and storage are pervasive as well as the desire to consume all these information by the users. However, the shear mass of information makes it impossible to effectively and efficiency consume or deliver the right information and the right time.

Personalization can allow for the right information, content, services, or products to the delivered to the right person in the right time for the correct context. In order for personalization to be effective or the most effective, the providers of these information, content, services, or products need information about the user to receive the information from the provider. Personalization can require the user to share personal information while maintaining a level of comfort for the amount of privacy the user wants to maintain.

Sharing settings to address these privacy concerns can be in the first device 102, in the second device 106, within the communication path 104, or a combination thereof. The sharing settings can be addressed and distributed between the first device 102, the second device 106, and the communication path 104.

Returning to the description of the computing system 100, the first device 102 can be of any of a variety of devices, such as a smartphone, a cellular phone, personal digital assistant, a tablet computer, a notebook computer, or other multi-functional display or entertainment device. The first device 102 can couple, either directly or indirectly, to the communication path 104 to communicate with the second device 106 or can be a stand-alone device.

For illustrative purposes, the computing system 100 is described with the first device 102 as a display device, although it is understood that the first device 102 can be different types of devices. For example, the first device 102 can also be a device for presenting images or a multi- media presentation. A multi-media presentation can be a presentation including sound, a sequence of streaming images or a video feed, text or a combination thereof.

The second device 106 can be any of a variety of centralized or decentralized computing devices, or video transmission devices. For example, the second device 106 can be a multimedia computer, a laptop computer, a desktop computer, a video game console, grid-computing resources, a virtualized computer resource, cloud computing resource, routers, switches, peer-to-peer distributed computing devices, a media playback device, a Digital Video Disk (DVD) player, a three-dimension enabled DVD player, a recording device, such as a camera or video camera, or a combination thereof. In another example, the second device 106 can be a signal receiver for receiving broadcast or live stream signals, such as a television receiver, a cable box, a satellite dish receiver, or a web enabled device.

The second device 106 can be centralized in a single room, distributed across different rooms, distributed across different geographical locations, embedded within a telecommunications network. The second device 106 can couple with the communication path 104 to communicate with the first device 102.

For illustrative purposes, the computing system 100 is described with the second device 106 as a computing device, although it is understood that the second device 106 can be different types of devices. Also for illustrative purposes, the computing system 100 is shown with the second device 106 and the first device 102 as end points of the communication path 104, although it is understood that the computing system 100 can have a different partition between the first device 102, the second device 106, and the communication path 104. For example, the first device 102, the second device 106, or a combination thereof can also function as part of the communication path 104.

The communication path 104 can span and represent a variety of network types and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
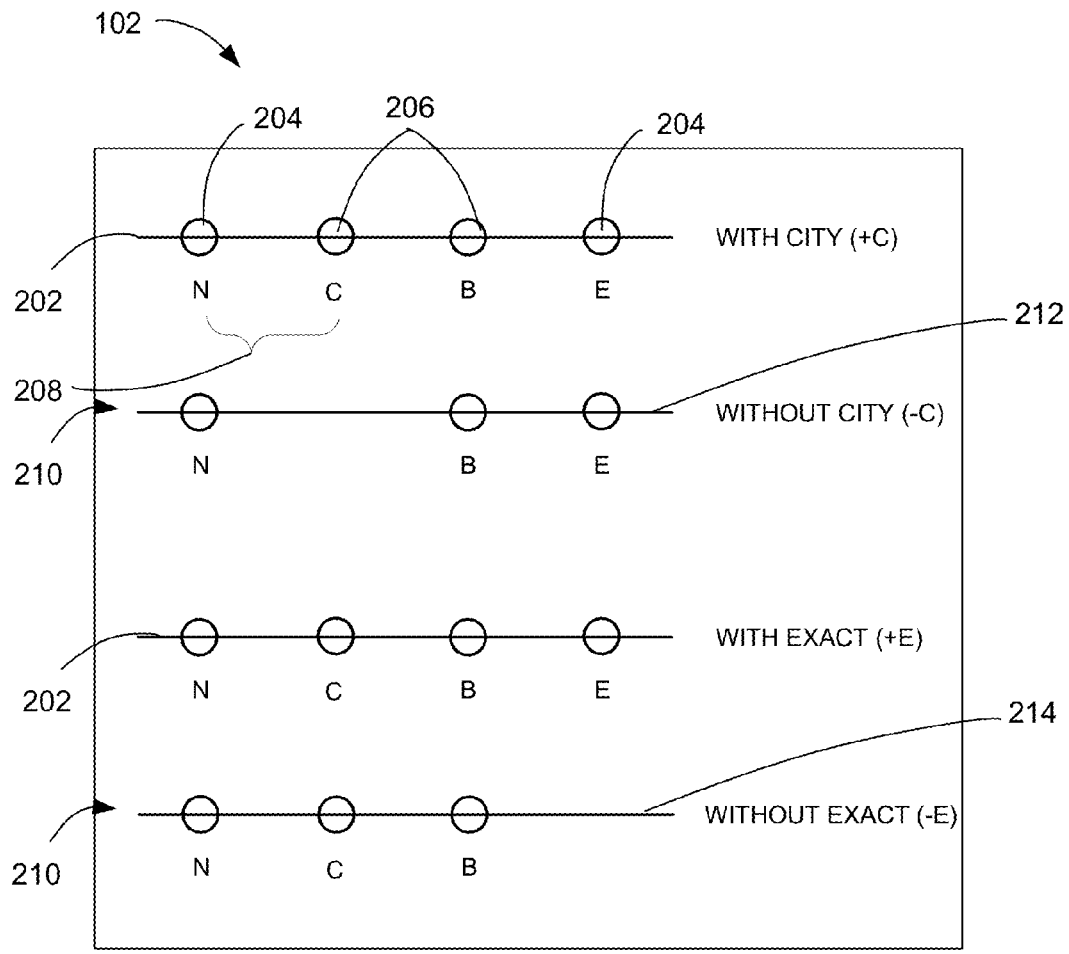
FIG. 2 is an example display of the first device with initial sharing options and potential sharing options.

Referring now to FIG. 2, therein is shown an example display of the first device 102 with initial sharing options 202. The display depicts the initial sharing options 202 as the first row and third row in FIG. 2. The initial sharing options 202 are the sharing options provided to select how much information to share. The information about the user can be shared with other people, such as friends, family, colleagues, coworkers, etc., or can be with business entities, such as service providers, advertisers, etc.

The embodiments of the present invention can apply to any type of information to be shared and the initial sharing options 202 can represent choices of how much information to share. For brevity, the embodiment of the present invention will be discussed with the example for location sharing.

Also for illustrative purpose, the initial sharing options 202 are shown being depicted on the first device 102, although it is understood that the initial sharing options 202 and the selection of them can be done on a different device. For example, the initial sharing options 202 can be depicted on the second device 106 of FIG. 1, a device within the communication path 104 of FIG. 1, or distributed among these devices and with the first device 102.

Returning to the example display of the first device 102, this example depicts the initial sharing options 202 with diametric sharing options 204 and intermediate sharing options 206. The diametric sharing options 204 reflect the two ends of the current set of sharing options for the most amount of information that can be shared and the least amount of information that can be shared. The intermediate sharing options 206 reflect the amount of information sharing between the two ends with the diametric sharing options 204.

For this location sharing example, one of the diametric sharing options 204 is to share "Nothing" or not share any location information and this is denoted as "N" in FIG. 2. At the other end, one of the diametric sharing options 204 is to share the "Exact" location and this is denoted as "E" in FIG. 2. In the example of location sharing, sharing "Nothing" is the least amount of information that can be shared representing the highest privacy setting while sharing "Exact" location is the most amount of information that can be shared representing the least privacy setting.

The intermediate sharing options 206, in this location sharing example, provides other options to share more information than the "Nothing" option but less information than the "Exact" option. One of the intermediate sharing options 206 can be to share "City" granularity and this is denoted as "C" in FIG. 2. Another of the intermediate sharing options 206 can be to share city "Block" level granularity and this is denoted as "B" in FIG. 2.

For illustrative purposes, the initial sharing options 202 are depicted with the options equally spaced from the next option, although it is understood that a spacing 208 between the options can be different. The relative distance of the spacing * from one option to another can represent the relative amount of sharing difference between the options. For example, the initial sharing options 202 can have the intermediate sharing options 206 spaced differently from each other than to the closest instance of the diametric sharing options 204. Another example can be the intermediate sharing options 206 can be closer to one of the diametric sharing options 204 than to the other.

In the initial sharing options 202, the diametric sharing options 204 and the intermediate sharing options 206 are depicted. However, to determine what mix of sharing options provide the desired privacy and the perceived benefit for the user to share information, other potential sharing options 210 are also depicted. The potential sharing options 210 are a set or sets of sharing options that are permutations of sharing options from the initial sharing options 202.

Examples of the potential sharing options 210 are depicted in FIG. 2 and are first potential options 212 and second potential options 214. The designation of first or second or other ordinal designations are not to imply importance in the embodiment of the present invention but used as designation for descriptive convenience.

In this example, the initial sharing options 202 is shown in the first row of FIG. denoted with "WITH CITY (+C)" indicating that the initial sharing options 202 includes the "City" option. The first potential options 212 is depicted as the second row in FIG. 2 and denoted with "WITHOUT CITY (−C)" indicating that the "City" option has been removed from the possible sharing options.

Continuing with this example, the initial sharing options 202 is also shown in the third row of FIG. denoted with "WITH EXACT (+E)" indicating that the initial sharing options 202 includes the "Exact" location sharing option. The second potential options 214 is depicted as the fourth row in FIG. 2 and denoted with "WITHOUT EXACT (−E)" indicating that the "Exact" location sharing option has been removed from the possible sharing options.

The initial sharing options 202 and the potential sharing options 210 will be discussed further below to determine the what set of sharing options provides the privacy desired by the user of the computing system 100 while providing benefit through sharing information and enabling personalization to be more effective.

Figure 3:
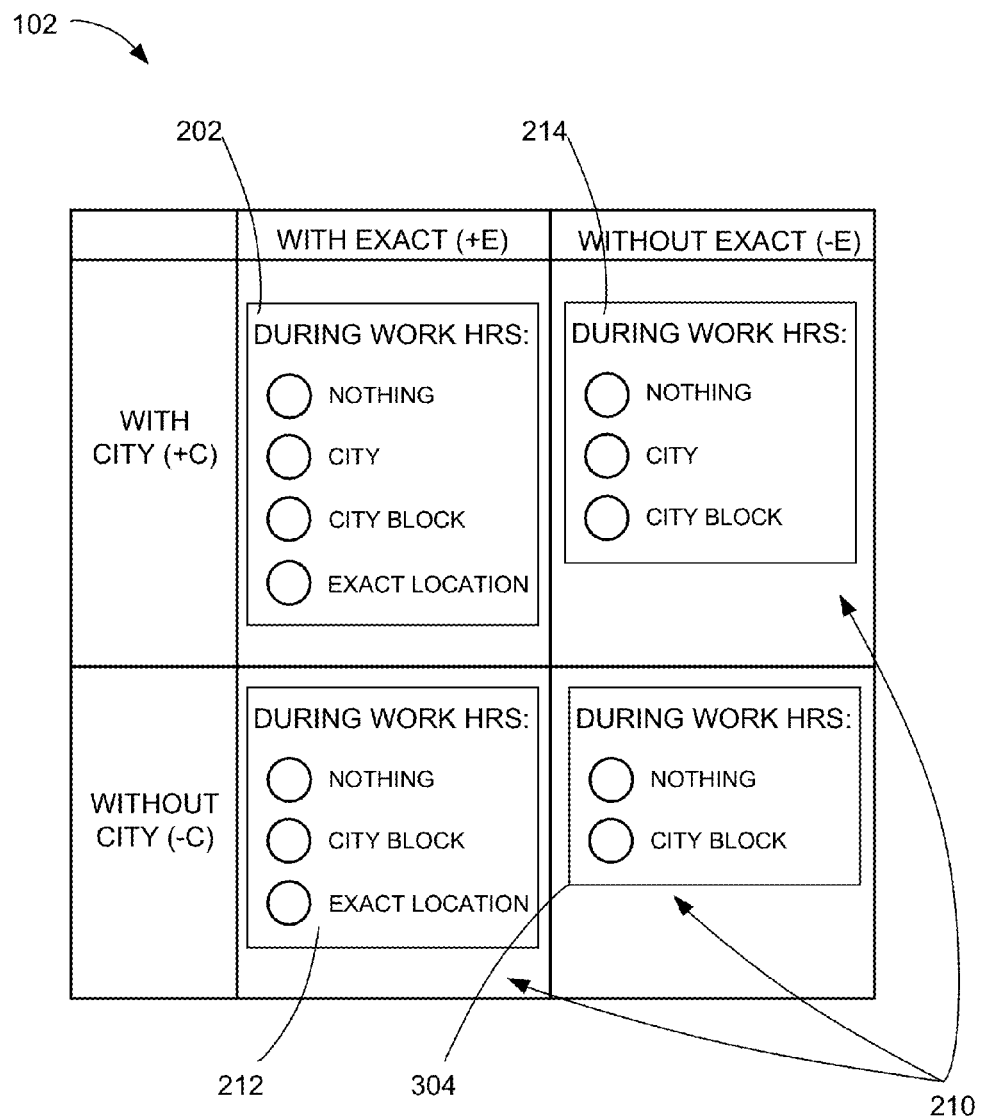
FIG. 3 is a further example display of the first device with initial sharing options and the potential sharing options based on a context.

Referring now to FIG. 3, therein is shown a further example display of the first device 102 with the initial sharing options 202 and the potential sharing options 210 based on a context 302. FIG. 3 depicts the initial sharing options 202 and the potential sharing options 210 in a matrix format. The initial sharing options 202 is depicted as the options in the matrix cell for "WITH CITY (+C)" and "WITH EXACT (+E)".

FIG. 3 also depicts the potential sharing options 210 discussed in FIG. 2. The first potential options 212 are depicted in the matrix cell for "WITHOUT CITY (−C)" and "WITH EXACT (+E)". The second potential options 214 are depicted in the matrix cell for "WITH CITY (+C)" and "WITHOUT EXACT (−E)". FIG. 3 depicts another permutation of the potential sharing options 210 or third potential options 304 depicted in the matrix cell for "WITHOUT CITY (−C)" and "WITHOUT EXACT (−E)".

For illustrative purposes, the computing system 100 is described with three instances of the potential sharing options 210 and two instances of the intermediate sharing options 206, although it is understood that the computing system 100 can be configured differently. For example, the number of the intermediate sharing options 206 can be less than two or more than two. Also, the number of the potential sharing options 210 can be any number based on the permutations of all the sharing options in the initial sharing options 202 in addition to some additional sharing option not present in the initial sharing options 202. Also, the potential sharing options 210 can be selected for specific permutations to determine the effect of removing or adding one or more sharing options to the user preference of the remaining or new set of options.

FIG. 3 also depicts the context 302 for the initial sharing options 202 and the potential sharing options 210. The context 302 provides scenarios that can affect the selection of the sharing options. In this example, the context 302 is during working hours for the selection of the sharing options.

For illustrative purposes, the computing system 100 is described with the context 302 of during working hours, although it is understood that the computing system 100 can provide different sharing options or the same sharing options for the context 302 that is different from work hours. For example, the context 302 can be environmental, such as work, off-work, vacation, in school, in a conference, in a remote site, in a new location, high crime rate, etc. The context 302 can be for the purpose of sharing. For example, the context 302 can be for the purpose of attaining a financial discount by receiving advertisements or coupons or of informing others with location information. The context 302 can depend on the personal attribute of the user, such as mood, fatigue, energetic, and preferences.

Figure 4:
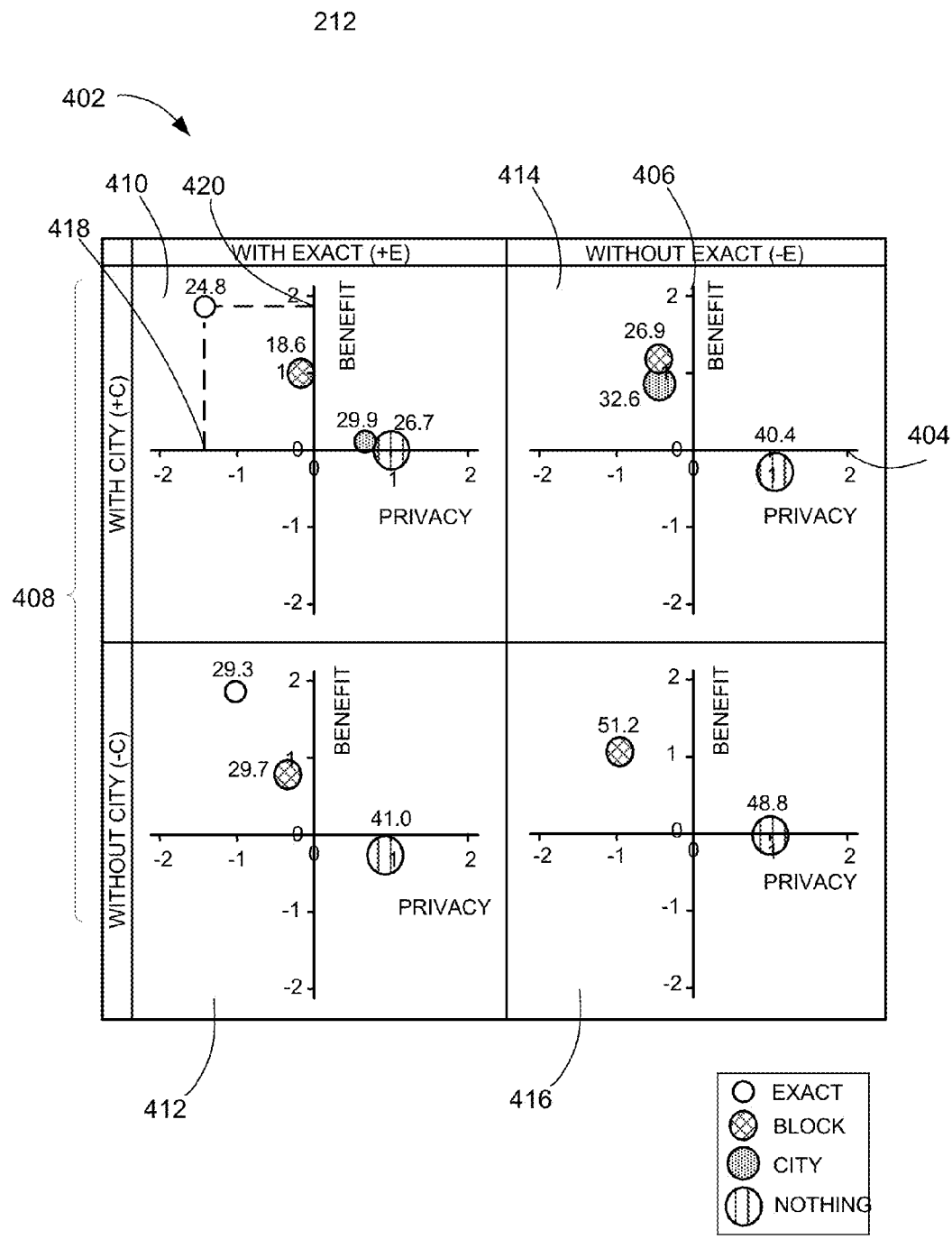
FIG. 4 is a graphical view of a map of the initial sharing options and the potential options with privacy ratings and benefit ratings.

Referring now to FIG. 4, therein is shown a graphical view of a map 402 of the initial sharing options 202 and the potential sharing options 210 plotted with privacy ratings 404 and benefit ratings 406. The privacy ratings 404 are the perceived privacy protection or preservation for a particular sharing option. The benefit ratings 406 are the perceived benefits to share a particular amount or type of information for a particular sharing option.

The map 402 depicts a matrix format similar to the one shown in FIG. 3 and the sharing options are located in the same matrix cell or matrix quadrant as described in FIG. 3. The map 402 depicts each matrix cell or matrix quadrant with a graph with an x-axis representing the privacy ratings 404 and a y-axis representing the benefit ratings 406. The map 402 includes distributions 408 of each of the sharing options for the initial sharing options 202 of FIG. 2 and the potential sharing options 210 of FIG. 3.

The distributions 408 can include an initial distribution 410, a first distribution 412, a second distribution 414, and a third distribution 416. The initial distribution 410 is for the initial sharing options 202. The first distribution 412 is for the first potential options 212 of FIG. 2. The second distribution 414 is for the second potential options 214 of FIG. 2. The third distribution 416 is for the third potential options 304 of FIG. 3.

The amount of sharing by adding or removing an option to the current set of options, for this example the initial sharing options 202, depends on how people perceive the sharing option in terms of the expected benefits and privacy threats that it may cause. The map 402 and the distributions 408 of the sharing options for each set of sharing options relative to the privacy ratings 404 and the benefit ratings 406 provide an example of what happens when a sharing option is added or removed depending on how close users perceive the added or removed option to be with respect to the other options.

For instance, if users who choose to share their city ("C") believe that this option is similar to sharing nothing ("N"), they will choose to share nothing when the city option is removed (and some will choose the city option instead of sharing nothing when the city option is introduced). But if they believe that the city option is more like sharing their city block ("B"), they will choose to share their city block when the city option is removed (and some will choose the city option instead of the city block option when the city option is introduced). They thus do not necessarily "err on the safe side", and therefore more sharing options is not always better.

For example, the initial sharing options 202 are depicted in the matrix cell for "WITH CITY (+C)" and "WITH EXACT (+E)" with a graph of the sharing options in the initial distribution 410. The initial distribution 410 provides a plot for each of the sharing options or for this example "N", "C", "B", and "E" based on a privacy score 418 for the privacy ratings 404 and a benefit score 420 for the benefit ratings 406 for each of these sharing options.

The first potential options 212 of FIG. 2 are depicted in the matrix cell for "WITHOUT CITY (−C)" and "WITH EXACT (+E)" with a graph of the sharing options in the first distribution 412. The first distribution 412 provides a plot for each of the sharing options or for this example "N", "B", and "E" based on the privacy score 418 for the privacy ratings 404 and the benefit score 420 for the benefit ratings 406 for each of these sharing options. The first potential options 212 do not provide the "C" sharing option. The removal of the "C" sharing option provides the change of sharing preference from the initial sharing options 202 to the other sharing options remaining with the first potential options 212.

The second potential options 214 of FIG. 2 are depicted in the matrix cell for "WITH CITY (+C)" and "WITHOUT EXACT (−E)" with a graph of the sharing options in the second distribution 414. The second distribution 414 provides a plot for each of the sharing options or for this example "N", "B", and "C" based on the privacy score 418 for the privacy ratings 404 and the benefit score 420 for the benefit ratings 406 for each of these sharing options. The second potential options 214 do not provide the "E" sharing option. The removal of the "E" sharing option provides the change of sharing preference from the initial sharing options 202 to the other sharing options remaining with the second potential options 214.

The third potential options 304 of FIG. 3 depicted as the matrix cell for "WITHOUT CITY (−C)" and "WITHOUT EXACT (−E)" with a graph of the sharing options in the third distribution 416. The third distribution 416 provides a plot for each of the sharing options or for this example "N" and "B" based on the privacy score 418 for the privacy ratings 404 and the benefit score 420 for the benefit ratings 406 for each of these sharing options. The third potential options 304 do not provide the "C" and "E" sharing options. The removal of the "C" and "E" sharing options provides the change of sharing preference from the initial sharing options 202 to the other sharing options remaining with the third potential options 304.

FIG. 4 demonstrates that providing more sharing options is not always better. In the example depicted in FIG. 4, a comparison of the second distribution 414 and the third distribution 416, or right-hand side of the of the matrix for "WITHOUT EXACT (−E)", the Block sharing option goes up from 26.9% (for the City sharing option available or "(+C)") to 51.2% (without the City sharing option available or "(−C)") indicating that the City sharing option is subjectively closer to Block. In other words, when City sharing option is removed, the percentage of users that choose Block sharing option goes up.

In the same comparison above, the Nothing sharing option goes up a little bit (from 40.4% to 48.4%). In other words, this smaller increase compared to the increase for the Block sharing option, the Nothing sharing option is not subjectively closer to the City sharing option as the Block sharing option.

A comparison of the initial distribution 410 and the first distribution 412, or the left-hand side of the matrix for "WITH EXACT (+E)", the City sharing option is somewhat closer to Nothing sharing option as shown by the percentage of users sharing Nothing increases more (from 26.7% to 41.0%) than Block (from 18.6% to 29.7%) when City sharing option is removed.

It has been discovered that the embodiment of the present invention provides more effective sharing options to users without resorting to simply providing more options or choices for the sharing preferences. Instead, a more effective set of sharing options with a lesser number of options is determined by understanding the perceived benefits and perceived privacy. The perceived benefits and perceived privacy is attained by generating the privacy score 418 and the benefit score 420 for each of the sharing choice and comparing these scores with permutations of the initial sharing options 202 as sharing options are removed.

Figure 5:
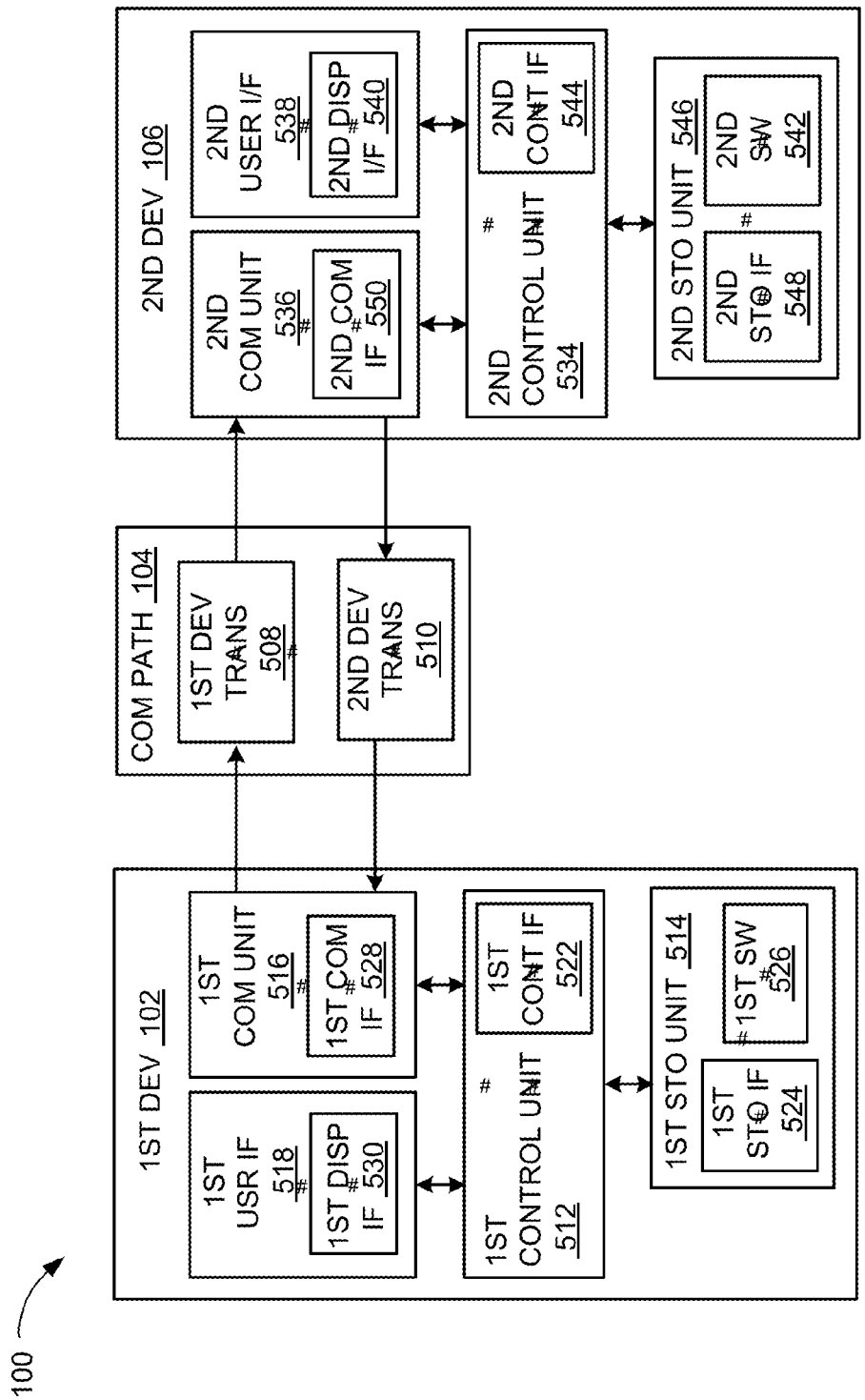
FIG. 5 is a functional block diagram of the computing system.

Referring now to FIG. 5, therein is shown an exemplary block diagram of the computing system 100. The computing system 100 can include the first device 102, the communication path 104, and the second device 106. The first device 102 can send information in a first device transmission 508 over the communication path 104 to the second device 106. The second device 106 can send information in a second device transmission 510 over the communication path 104 to the first device 102.

For illustrative purposes, the computing system 100 is shown with the first device 102 as a client device, although it is understood that the computing system 100 can have the first device 102 as a different type of device. For example, the first device 102 can be a server having a display interface.

Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 512, a first storage unit 514, a first communication unit 516, and a first user interface 518. The first control unit 512 can include a first control interface 522. The first control unit 512 can execute a first software 526 to provide the intelligence of the computing system 100.

The first control unit 512 can be implemented in a number of different manners. For example, the first control unit 512 can be a processor, an application specific integrated circuit (ASIC) an embedded processor, a microprocessor, a hardware control logic, a hardware finite state machine (FSM), a digital signal processor (DSP), or a combination thereof. The first control interface 522 can be used for communication between the first control unit 512 and other functional units in the first device 102. The first control interface 522 can also be used for communication that is external to the first device 102.

The first control interface 522 can receive information from the other functional units or from external sources, or can transmit information to the other functional units or to external destinations. The external sources and the external destinations refer to sources and destinations external to the first device 102.

The first control interface 522 can be implemented in different ways and can include different implementations depending on which functional units or external units are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

A first storage unit 514 can store the first software 526. The first storage unit 514 can also store the relevant information, such as data representing incoming images, data representing previously presented image, sound files, or a combination thereof.

The first storage unit 514 can be a volatile memory, a nonvolatile memory, an internal memory, an external memory, or a combination thereof. For example, the first storage unit 514 can be a nonvolatile storage such as nonvolatile random access memory (NVRAM), Flash memory, disk storage, or a volatile storage such as static random access memory (SRAM).

The first storage unit 514 can include a first storage interface 524. The first storage interface 524 can be used for communication between and other functional units in the first device 102. The first storage interface 524 can also be used for communication that is external to the first device 102.

The first storage interface 524 can receive information from the other functional units or from external sources, or can transmit information to the other functional units or to external destinations. The external sources and the external destinations refer to sources and destinations external to the first device 102.

The first storage interface 524 can include different implementations depending on which functional units or external units are being interfaced with the first storage unit 514. The first storage interface 524 can be implemented with technologies and techniques similar to the implementation of the first control interface 522.

A first communication unit 516 can enable external communication to and from the first device 102. For example, the first communication unit 516 can permit the first device 102 to communicate with the second device 106 of FIG. 1, an attachment, such as a peripheral device or a computer desktop, and the communication path 104.

The first communication unit 516 can also function as a communication hub allowing the first device 102 to function as part of the communication path 104 and not limited to be an end point or terminal unit to the communication path 104. The first communication unit 516 can include active and passive components, such as microelectronics or an antenna, for interaction with the communication path 104.

The first communication unit 516 can include a first communication interface 528. The first communication interface 528 can be used for communication between the first communication unit 516 and other functional units in the first device 102. The first communication interface 528 can receive information from the other functional units or can transmit information to the other functional units.

The first communication interface 528 can include different implementations depending on which functional units are being interfaced with the first communication unit 516. The first communication interface 528 can be implemented with technologies and techniques similar to the implementation of the first control interface 522.

The first user interface 518 allows a user (not shown) to interface and interact with the first device 102. The first user interface 518 can include an input device and an output device. Examples of the input device of the first user interface 518 can include a keypad, a touchpad, soft-keys, a keyboard, a microphone, an infrared sensor for receiving remote signals, or any combination thereof to provide data and communication inputs.

The first user interface 518 can include a first display interface 530. The first display interface 530 can include a display, a projector, a video screen, a speaker, or any combination thereof.

The first control unit 512 can operate the first user interface 518 to display information generated by the computing system 100. The first control unit 512 can also execute the first software 526 for the other functions of the computing system 100. The first control unit 512 can further execute the first software 526 for interaction with the communication path 104 via the first communication unit 516.

The second device 106 can be optimized for implementing the present invention in a multiple device embodiment with the first device 102. The second device 106 can provide the additional or higher performance processing power compared to the first device 102. The second device 106 can include a second control unit 534, a second communication unit 536, and a second user interface 538.

The second user interface 538 allows a user (not shown) to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

The second control unit 534 can execute a second software 542 to provide the intelligence of the second device 106 of the computing system 100. The second software 542 can operate in conjunction with the first software 526. The second control unit 534 can provide additional performance compared to the first control unit 512.

The second control unit 534 can operate the second user interface 538 to display information. The second control unit 534 can also execute the second software 542 for the other functions of the computing system 100, including operating the second communication unit 536 to communicate with the first device 102 over the communication path 104.

The second control unit 534 can be implemented in a number of different manners. For example, the second control unit 534 can be a processor, an embedded processor, a microprocessor, hardware control logic, a hardware finite state machine (FSM), a digital signal processor (DSP), or a combination thereof.

The second control unit 534 can include a second controller interface 544. The second controller interface 544 can be used for communication between the second control unit 534 and other functional units in the second device 106. The second controller interface 544 can also be used for communication that is external to the second device 106.

The second controller interface 544 can receive information from the other functional units or from external sources, or can transmit information to the other functional units or to external destinations. The external sources and the external destinations refer to sources and destinations external to the second device 106.

The second controller interface 544 can be implemented in different ways and can include different implementations depending on which functional units or external units are being interfaced with the second controller interface 544. For example, the second controller interface 544 can be implemented with a pressure sensor, an inertial sensor, a microelectromechanical system (MEMS), optical circuitry, waveguides, wireless circuitry, wireline circuitry, or a combination thereof.

A second storage unit 546 can store the second software 542. The second storage unit 546 can also store the such as data representing incoming images, data representing previously presented image, sound files, or a combination thereof. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the computing system 100 is shown with the second storage unit 546 as a single hierarchy storage system, although it is understood that the computing system 100 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as nonvolatile random access memory (NVRAM), Flash memory, disk storage, or a volatile storage such as static random access memory (SRAM).

The second storage unit 546 can include a second storage interface 548. The second storage interface 548 can be used for communication between other functional units in the second device 106. The second storage interface 548 can also be used for communication that is external to the second device 106.

The second storage interface 548 can receive information from the other functional units or from external sources, or can transmit information to the other functional units or to external destinations. The external sources and the external destinations refer to sources and destinations external to the second device 106.

The second storage interface 548 can include different implementations depending on which functional units or external units are being interfaced with the second storage unit 546. The second storage interface 548 can be implemented with technologies and techniques similar to the implementation of the second controller interface 544.

The second communication unit 536 can enable external communication to and from the second device 106. For example, the second communication unit 536 can permit the second device 106 to communicate with the first device 102 over the communication path 104.

The second communication unit 536 can also function as a communication hub allowing the second device 106 to function as part of the communication path 104 and not limited to be an end point or terminal unit to the communication path 104. The second communication unit 536 can include active and passive components, such as microelectronics or an antenna, for interaction with the communication path 104.

The second communication unit 536 can include a second communication interface 550. The second communication interface 550 can be used for communication between the second communication unit 536 and other functional units in the second device 106. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second controller interface 544.

The first communication unit 516 can couple with the communication path 104 to send information to the second device 106 in the first device transmission 508. The second device 106 can receive information in the second communication unit 536 from the first device transmission 508 of the communication path 104.

The second communication unit 536 can couple with the communication path 104 to send information to the first device 102 in the second device transmission 510. The first device 102 can receive information in the first communication unit 516 from the second device transmission 510 of the communication path 104. The computing system 100 can be executed by the first control unit 512, the second control unit 534, or a combination thereof. For illustrative purposes, the second device 106 is shown with the partition having the second user interface 538, the second storage unit 546, the second control unit 534, and the second communication unit 536, although it is understood that the second device 106 can have a different partition. For example, the second software 542 can be partitioned differently such that some or all of its function can be in the second control unit 534 and the second communication unit 536. Also, the second device 106 can include other functional units not shown in FIG. 5 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the computing system 100 is described by operation of the first device 102 and the second device 106. It is understood that the first device 102 and the second device 106 can operate any of the modules and functions of the computing system 100.

Figure 6:
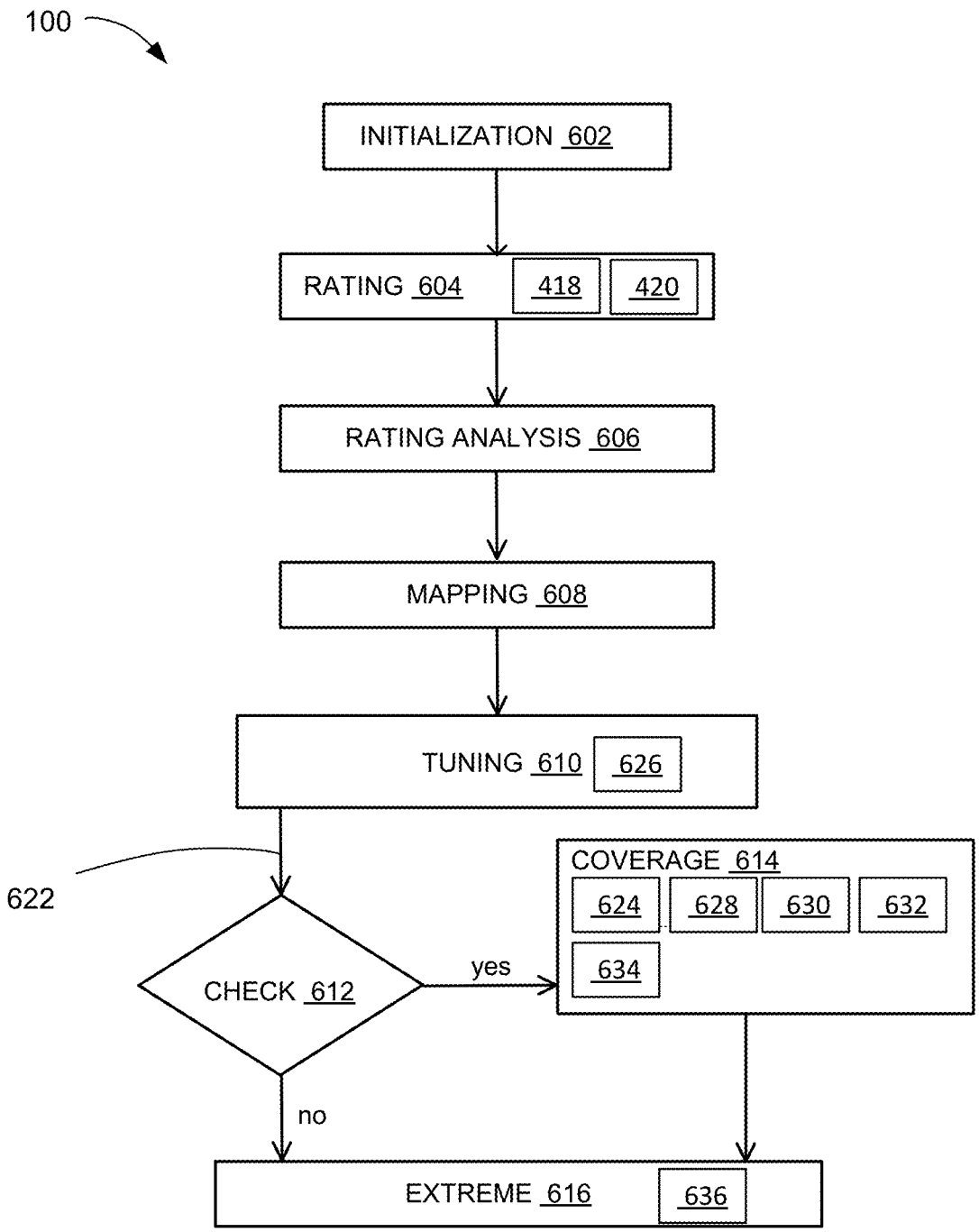
FIG. 6 is a control flow of the computing system.

Referring now to FIG. 6, therein is shown a control flow of the computing system 100. The computing system 100 can include an initialization module 602, a rating module 604, a rating analysis module 606, a mapping module 608, a tuning module 610, a check module 612, a coverage module 614, and an extreme option module 616. For brevity and for example, the modules noted above and below are coupled to one another as shown in FIG. 6 and the following figures.

The initialization module 602 generates the initial sharing options 202 of FIG. 2. The initialization module 602 can generate the initial sharing options 202 in a number of ways. For example, the initial sharing options 202 can be generated based on existing sharing options previously used. The initial sharing options 202 can also generated by a random distribution of the sharing options or in an equally spaced distribution with the spacing 208 of FIG. 2 being equal between the each option in the initial sharing options 202 to the neighboring option.

Also for example, the initial sharing options 202 can be generated based on the context 302 of FIG. 3. The context 302 can limit or increase or decrease the number of sharing options or the types of sharing options for the initial sharing options 202.

The context 302 can increase the number of choices in the initial sharing options 202 if the community or crowd sourced information for a particular context various extensively for a particular application program, as an example. The increased numbers can provide coverage for the initial sharing options 202 to be tuned more accurately. The context 302 can decrease the number of choices in the initial sharing options 202, as an example, when the community or crowd sourced information for a particular context is very narrow or towards sharing very openly or more towards protecting privacy.

The context 302 can affect the types of sharing options, if for example, the computing system 100, or as a more specific example the first device 102 of FIG. 1, is operating in an unfamiliar area, then the types of the initial sharing options 202 can be more towards protecting privacy. In contrast, the user can be in a conference where the preference is share particular contact information and to receive contact information from industry peers attending the conference.

The initialization module 602 can be operated in the first control unit 512 of FIG. 5, the second control unit 534 of FIG. 5, or a combination thereof to generate the initial sharing options 202. The initialization module 602 can also accept input for the initial sharing options 202. The input can be from a database or from human input. The flow can continue from the initialization module 602 to the rating module 604.

The rating module 604 generates the privacy ratings 404 and the benefit ratings 406 for each sharing option within the initial sharing options 202 of FIG. 2 and within the potential sharing options 210 of FIG. 3. As an example, one value for the privacy ratings 404 and one value for the benefit ratings 406 is assigned by each person providing the rating for each sharing option within the initial sharing options 202.

For example, the rating module 604 can generate questions to ask a sample of (potential) users of the application about the perceived privacy and benefits of the available sharing options. For example, for each option they have the users rate the statements "I would share [option] if I don't want the other person to know where I am" (Privacy) and "I would share [option] if my location could be useful to the other person" (Benefit) on a 7-point scale.

For illustrative purposes, the value range for the privacy ratings 404 and the benefit ratings 406 are described using a 7-point scale, although it is understood that the scale can be different. For example, the value for each of the privacy ratings 404 and the benefit ratings 406 can be a binary value, such as 0 or 1, where 0 means no and 1 means yes.

The queries can be displayed as part of the application initialization process. The queries can also be invoked if the computing system 100 detects a difference in the context 302 for the application. The flow can continue from the rating module 604 to the rating analysis module 606.

The rating analysis module 606 calculates the privacy score 418 for the privacy ratings 404 and the benefit score 420 for the benefit ratings 406 for each sharing choice for the initial sharing options 202 based on the inputs from the rating module 604.

The privacy score 418 can be calculated in a number of ways. For example, the privacy score 418 can be calculated as an average for the privacy ratings 404 for each sharing choice in the initial sharing options 202. The privacy score 418 can also be calculated as a median for the privacy ratings 404 for each sharing choice.

The benefit score 420 can be calculated in a number of ways. For example, the benefit score 420 can be calculated as an average for the benefit ratings 406 for each sharing choice in the initial sharing options 202. The benefit score 420 can also be calculated as a median for the benefit ratings 406 for each sharing choice.

The rating analysis module 606 can be operated in the first control unit 512, the second control unit 534, or a combination thereof to generate the privacy score 418, the benefit score 420, or a combination thereof. The flow can continue from the rating analysis module 606 to the mapping module 608.

The mapping module 608 plots each of the sharing choice for a particular set of sharing options. As shown in FIG. 4, the mapping module 608 can generate the map 402 of FIG. 4 with the initial distribution 410 for the initial sharing options 202.

The initial distribution 410 of FIG. 4 depicts each sharing choice in the initial sharing options 202 plotted along the x-axis and the y-axis with the privacy score 418 and the benefit score 420 for each of the sharing choice. The flow can continue from the mapping module 608 to the tuning module 610.

The tuning module 610 generates tuned sharing options 622 based on the initial sharing options 202, the initial distribution 410, or a combination thereof. The tuned sharing options 622 provide sharing options into a more useful and concise (smaller) set of sharing options to show to users.

As the context 302 can affect generation of the initial sharing options 202, the generation of the tuned sharing options 622 can also be affected by the context 302 at least because the tuned sharing options 622 is based on the initial sharing options 202 as inputs to the tuning module 610. Further, the tuning module 610 can regenerate a new set of sharing choices for the tuned sharing options 622 based on a change in the context 302, such as a change in an environment from familiar to unfamiliar surroundings, as described more in FIG. 7.

The tuning module 610 will be discussed more in detail in FIG. 7 and depicted in FIG. 8. The flow can continue from the tuning module 610 to the check module 612.

The check module 612 determines if there exists a non-covered region 624 in a tuned distribution 626 for the tuned sharing options 622. The tuned distribution 626 is similar to the initial distribution 410 for the options in the tuned sharing options 622. The non-covered region 624 is an area or a portion of the graph for the tuned sharing options 622 not covered by a sharing option from the tuned sharing options 622. However, the tuning module 610 can provide the check module 612 areas where one or more sharing options were removed so as to avoid inadvertently inserting a sharing option having very low values for both the privacy score 418 and the benefit score 420. The removal by the tuning module 610 is described in more details in FIG. 7.

The non-covered region 624 can be determined in a number of ways. For example, a sliding window 628 can be used to determine if an area in a graph for the tuned sharing options 622 is void of a sharing option. The sliding window 628 can be moved over the entire area of the graph to search if such a void exists. As a more specific example, the diagonal of the sliding window 628 being void of a sharing option can determine a non-covered region 624.

Another way to determine the non-covered region 624 is based on a privacy separation threshold 630, a benefit separation threshold 632, or a combination thereof. The privacy separation threshold 630 is the maximum distance along the x-axis without a sharing option in the tuned sharing options 622 before determining that portion of the graph to be the non-covered region 624. Similarly, the benefit separation threshold 632 is the maximum distance along the y-axis without a sharing option in the tuned sharing options 622 before determining that portion of the graph to be the non-covered region 624.

The privacy separation threshold 630 and the benefit separation threshold 632 can function independently of each other to determine the non-covered region 624. Also, the privacy separation threshold 630 and the benefit separation threshold 632 can function with each other to determine the non-covered region 624. The privacy separation threshold 630 and the benefit separation threshold 632 can also be used to form the sliding window 628.

The context 302 can affect the determination of the non-covered region 624 with either example approaches above or other approaches. As an example, if the context 302 is an unfamiliar area, the privacy separation threshold 630 can be set to a lower value than if the context 302 is a familiar area. Similarly, the context 302 of an unfamiliar area can have the sliding window 628 thinner along the x-axis than if the context 302 is a familiar area.

If the check module 612 determines that the non-covered region 624 exists for the tuned sharing options 622, then the flow can continue from the check module 612 to the coverage module 614. If the check module 612 determines that the non-covered region 624 does not exist for the tuned sharing options 622, then the flow can continue from the check module 612 to the extreme option module 616.

The coverage module 614 inserts or generates a coverage option 634 in the non-covered region 624 determined by the check module 612. The coverage option 634 is a sharing option added to the tuned sharing options 622 to fill in the void in the non-covered region 624.

The coverage option 634 can be placed in the non-covered region 624 in a number of ways. For example, the coverage option 634 can be placed at a center of the sliding window 628 or as close to the center as reasonably possible. The coverage option 634 can also be placed at the perimeter of the sliding window 628 or even at the corners of the sliding window 628. For the examples involving the privacy separation threshold 630 and the benefit separation threshold 632, the coverage option 634 can be placed at the middle of the location within the distance along the x-axis covered by the privacy separation threshold 630 or within the distance along the y-axis covered by the benefit separation threshold 632.

The computing system 100 has been described with module functions or order as an example. The computing system 100 can partition the modules differently or order the modules differently. For example, although FIG. 6 depicts the flow continuing from the coverage module 614 to the extreme option module 616, it is understood that the flow from the coverage module 614 can progress differently. For example, the flow can continue from the coverage module 614 back to the check module 612 to see if there are other regions that can be determined to be the non-covered region 624 even with the coverage option 634 added to the tuned sharing options 622. Also, the flow can continue this loop until the non-covered region 624 is no longer found. Further, the flow can continue to the extreme option module 616 if, for example, all the regions that are non-covered are found in the check module 612 prior to moving to the next module.

The extreme option module 616 adds a sharing option referred to as an extreme sharing option 636 that share more information than any of the options in the tuned sharing options 622 and the coverage option 634. Returning to the graph in FIG. 4, the addition of the extreme sharing option 636 increases the likelihood of sharing information. FIG. 4 demonstrates this effect. The percentage of users who share Nothing, with the Nothing sharing option, goes down when Exact sharing option is introduced (from 40.4% to 26.7% in the top row of the map 402 of FIG. 4 depicted with "WITH CITY (+C)", and from 48.8% to 41.0% in the bottom row of the map 402 depicted with "WITHOUT CITY (−C)").

It has been discovered that the embodiment of the present invention provides more sharing information by adding the extreme sharing option 636, which is a sharing option that shares more than all existing options, likely increases sharing of information even for users who previously shared much less than the amount of information shared with the extreme sharing option.

The modules described in this application can be hardware implementation, hardware circuitry, or hardware accelerators in the first control unit 512 of FIG. 5 or in the second control unit 534 of FIG. 5. The modules can also be hardware implementation, hardware circuitry, or hardware accelerators within the first device 102 or the second device 106 but outside of the first control unit 512 or the second control unit 534, respectively.

The modules described in this application can be stored in a non-transitory computer readable medium. The first storage unit 514 of FIG. 5, the second storage unit 546 of FIG. 5, or a combination thereof can represent the non-transitory computer readable medium. The first storage unit 514, the second storage unit 546, or a combination thereof or a portion thereof can be removable from the first device 102 of FIG. 5 or the second device 106 of FIG. 5. Examples of the non-transitory computer readable medium can be a non-volatile memory card or stick, an external hard disk drive, a tape cassette, or an optical disk.

Figure 7:
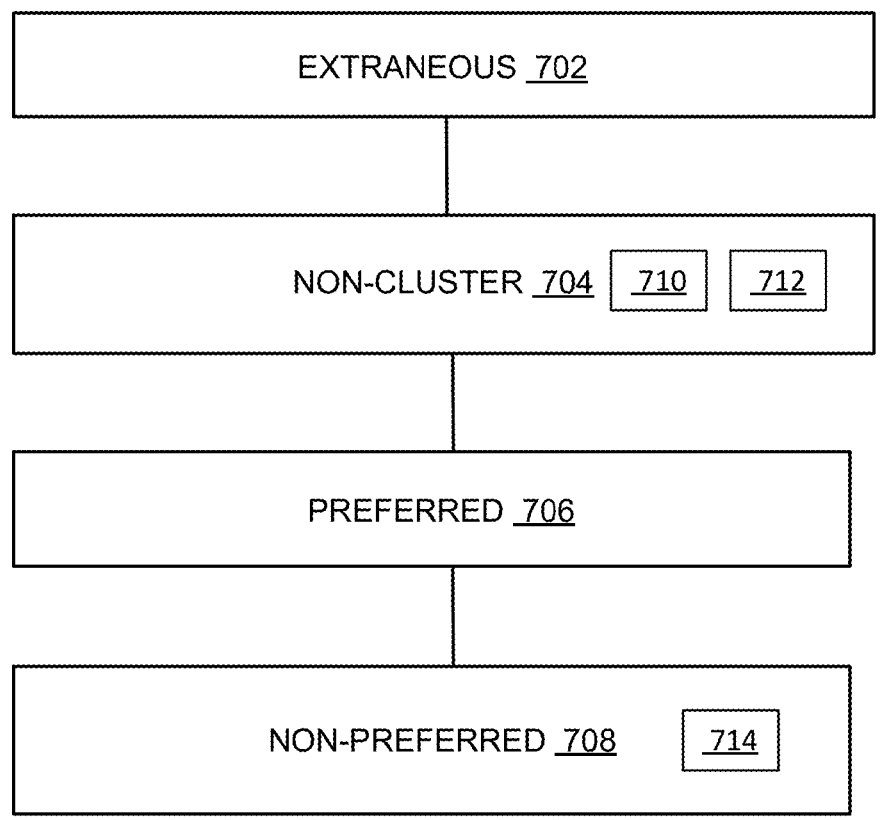
FIG. 7 is a view of the tuning module.

Referring now to FIG. 7, therein is shown a view of the tuning module 610. As noted earlier, the tuning module 610 generates tuned sharing options 622 based on the initial sharing options 202 of FIG. 2, the initial distribution 410 of FIG. 4, or a combination thereof. The tuning module 610 operates on each of the options in the initial sharing options 202 with the privacy score 418 of FIG. 4 and the benefit score 420 of FIG. 4 based on the findings discussed in FIG. 4 with the potential sharing options 210 of FIG. 3. The tuning module 610 can include an extraneous option module 702, a non-cluster module 704, a preferred option module 706, and a non-preferred option module 708.

For illustrative purposes, the tuning module 610 is described as operating on the initial sharing options 202 and the initial distribution 410 plotted against the privacy ratings 404 of FIG. 4 and the benefit ratings 406 of FIG. 4, although it is understood that the tuning module 610 can operate with different inputs. For example, the tuning module 610 can also operate on one or more of the potential sharing options 210.

The tuning module 610 can further operate on the combination of the initial sharing options 202 and the potential sharing options 210. For brevity, the tuning module 610 will be described operating with the initial sharing options 202.

The extraneous option module 702 removes one or more sharing options available in the initial sharing options 202 that has low values for both the privacy score 418 and the benefit score 420 while other sharing options exists. For example, the extraneous option module 702 can remove any sharing options that score so low on both privacy and benefit that they are dominated by some of the other options. In other words, the extraneous option module 702 can remove one or more of the initial sharing options 202 when the remaining instances of the initial sharing options 202 provide the privacy score 418 or the benefit score 420 better than the ones removed.

The determination for a sharing option being dominated by another sharing option can be performed in a number of ways. For example, the extraneous option module 702 can scan and analyze the initial distribution 410 for a sharing option having negative values for both the privacy score 418 and the benefit score 420. If such an option is identified, the extraneous option module 702 can search for another option in the initial sharing options 202 having the same or similar value for the privacy score 418 but with a higher value for the benefit score 420. If such as option exists, then the sharing option having negative scores for both the privacy score 418 and the benefit score 420 is removed from the initial sharing options 202.

As a further example, the extraneous option module 702 can search the initial distribution 410 for a sharing option having a negative value for the benefit score 420. If such an options is identified, the extraneous option module 702 can search for another option in the initial sharing options 202 that has the same or similar value for the privacy score 418 (positive or negative), but with a higher value for the benefit score 420. If such as option exists, then the sharing option having a negative value for the benefit score 420 is removed from the initial sharing options 202.

The flow can continue from the extraneous option module 702 to the non-cluster module 704. For brevity, the modules in the tuning module 610 will be described operating on the initial sharing options 202 and the effects of the operations from any preceding modules is forwarded to the subsequent modules in the tuning module 610, even though the designation remains as the initial sharing options 202. After the tuning module 610 completes is process, the output of the tuning module 610 is the tuned sharing options 622 and no longer designated as the initial sharing options 202. It is possible that the tuned sharing options 622 can be the same as the initial sharing options 202.

The non-cluster module 704 removes one or more sharing options that are close together. For example, for options that are very close together, the non-cluster module 704 can select the option that is most beneficial from a system perspective, and remove the other options. In other words, the non-cluster module 704 can remove one or more of the initial sharing options 202 when the remaining instances of the initial sharing options 202 is clustered to the ones removed.

The non-cluster module 704 can include a cluster benefit threshold 710 and a cluster privacy threshold 712. The cluster benefit threshold 710 provides a range for comparison of the benefit score 420 between adjacent options to determine if those options are clustered. The cluster privacy threshold 712 provides a range for comparison of the privacy score 418 between adjacent options to determine if those options are clustered. The non-cluster module 704 can operate using the cluster benefit threshold 710 in conjunction with the cluster privacy threshold 712 or independently of each other.

The non-cluster module 704 can determine options that are close together or clustered in a number of ways. For example, if multiple options have same value for the privacy score 418 and the benefit score 420 differ less than the cluster benefit threshold 710, then the option with the lower value for the benefit score 420 can be removed. Similarly, as an example, if multiple options have same value for the benefit score 420 and the privacy score 418 differ less than the cluster privacy threshold 712, then the option with the lower value for the privacy score 418 can be removed. This can be an example of removing an option less beneficial to the computing system 100 if more sharing of information is preferred.

The flow can continue from the non-cluster module 704 to the preferred option module 706. The preferred option module 706 promotes one or more sharing options in order to promote certain sharing of information. In other words, the preferred option module 706 can remove one or more of the initial sharing options 202 when the remaining instances of the initial sharing options 202 is more likely to be chosen.

The preferred option module 706 can promote the sharing options in a number of ways. For example, the preferred option module 706 can identify options providing a minimum sharing level and can remove the surrounding sharing options that are below the minimum sharing level, in other words, below a particular value or threshold for the privacy score 418. As a further example, the preferred option module 706 can identify options providing a minimum security level can remove the surrounding sharing options that are below the minimum security level or above a particular value or threshold for the privacy score 418.

Regardless of the method used to promote sharing options, the selected or non-removed options can be viewed as preferred options that are more likely to be the option closest to the user's actual preferences. The flow can continue from the preferred option module 706 to the non-preferred option module 708.

The non-preferred option module 708 replaces one or more sharing options not preferred with a preferred sharing option 714 that is not part of the initial sharing options 202. The determination of replacement of a sharing option can follow a similar process as in the preferred option module 706 where the determination can be made based on the goal for more sharing or more security. The added functionality of the non-preferred option module 708 over the preferred option module 706 is the functionality of inserting or adding the preferred sharing option 714.

The non-preferred option module 708 can add the preferred sharing option 714 in a number of ways. For example, the non-preferred option module 708 can added based on the goal of meeting minimum sharing or minimum security. The placement and functionality of the preferred sharing option 714 can be towards the more positive end of the x-axis (privacy) or can be towards the more negative end of the x-axis.

In this example, the completion of the operation of the non-preferred option module 708 provides the tuned sharing options 622. The flow can continue to the check module 612.

It has been discovered that the computing system 100 or more specifically the tuning module 610 systematically removes redundant options or options that are close together with each other from the initial sharing options 202 or even the potential sharing options 210. The ending results is the tuned sharing options 622 and reduces screen clutter and reduce user choice difficulty. Most importantly embodiment of the present invention can strategically allow the increase of user sharing amount and increase personalization of information and the effectiveness of personalization. Also, the strategic selection of options with the preferred sharing option 714 can also increase sharing of information.

The modules described in this application can be part of the first software 526 of FIG. 5, the second software 542 of FIG. 5, or a combination thereof. These modules can also be stored in the first storage unit 514 of FIG. 5, the second storage unit 546 of FIG. 5, or a combination thereof. The first control unit 512, the second control unit 534, or a combination thereof can execute these modules for operating the computing system 100.

Figure 8:
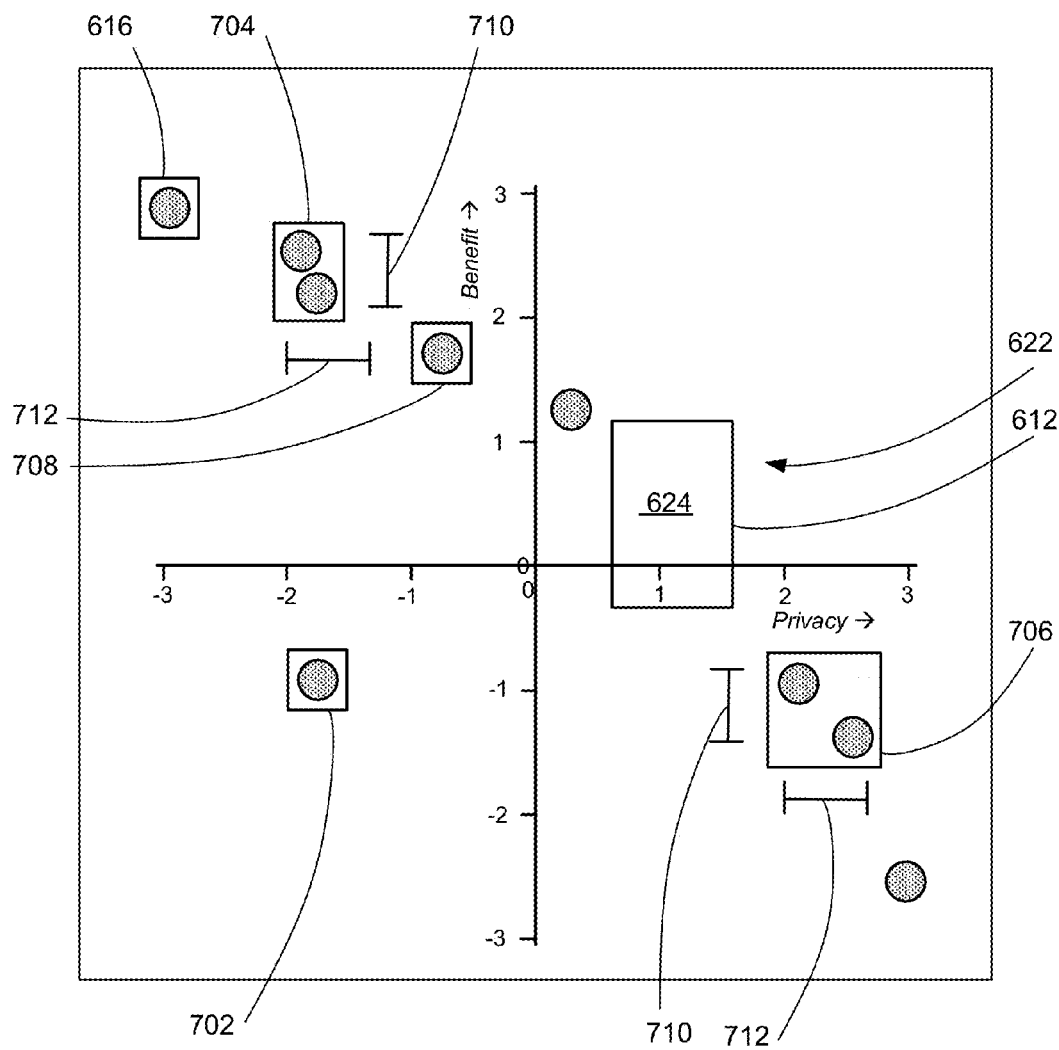
FIG. 8 is a graphical view of an exemplary map for the operations of the tuning module, the check module, the coverage module, and the extreme option module.

Referring now to FIG. 8, therein is shown a graphical view of an exemplary map during an operation of the tuning module 610, the check module 612, the coverage module 614, and the extreme option module 616. For description ease, FIG. 8 is depicted with module numbers for the exemplary operation applied to the initial sharing options 202 of FIG. 2 with the initial distribution of FIG. 2. The initial sharing options 202 and the initial distribution 410 are not labeled in FIG. 8 for illustrative clarity.

FIG. 8 depicts a sharing option having negative values for both the privacy score 418 of FIG. 4 and the benefit score 420 of FIG. 4. For this sharing option, the extraneous option module 702 removes this option because there is another sharing option, the one of the grouped options and will be operated upon by the non-cluster module 704, having a similar value for the privacy score 418 but a better value for the benefit score 420.

FIG. 8 depicts two sharing options abutting next to each other or in a cluster. The non-cluster module 704 can remove a redundant option. In this example, two sharing options are shown abutting each other. These two sharing options along the x-axis are within the cluster privacy threshold 712 such that the non-cluster module 704 determines that these two sharing options are in a cluster and one of them should be removed. The two sharing options along the y-axis extend beyond the cluster benefit threshold 710 such that the non-cluster module 704 would not determine these two sharing options to be a cluster based on this comparison.

For illustrative purposes, the non-cluster module 704 is described comparing the full dimension of the sharing options along both the x-axis and the y-axis with the cluster privacy threshold 712 and the cluster benefit threshold 710, respectively, although it is understood that the non-cluster module 704 can operate differently. For example, the cluster privacy threshold 712 and the cluster benefit threshold 710 can be compared from center to center of the sharing options. Also for example, the comparison can be made between the highest or lowest value along its respective axis for each of the sharing option.

FIG. 8 depicts two sharing options close to each other but not abutting or not in a cluster because these two sharing options extend along the x-axis and the y-axis beyond the cluster privacy threshold 712 and the cluster benefit threshold 710. The preferred option module 706 can remove the option with the lower value for the privacy score 418, for example, if the option with the higher value for the privacy score 418 is promoted over the lower value.

FIG. 8 depicts a sharing option with a negative value for the privacy score 418 and positive value for the benefit score 420 and closest to the y-axis. The non-preferred option module 708 can replace this option with the preferred sharing option 714 of FIG. 7.

FIG. 8 depicts the sliding window 628 represented as a rectangular window, as an example. The check module 612 operates with this sliding window 628, as an example, to determine or identify a non-covered region 624 of FIG. 6. To avoid creating clusters, it is preferred to have the dimensions of the sliding window 628 to extend beyond the cluster privacy threshold 712 and the cluster benefit threshold 710. If the check module 612 uses the privacy separation threshold 630 of FIG. 6 or the benefit separation threshold 632 of FIG. 6, then these values should extend beyond the cluster privacy threshold 712 and the cluster benefit threshold 710, respectively, to avoid forming a cluster.

FIG. 8 depicts the extreme sharing option 636 added by the extreme option module 616. The extreme sharing option 636 is depicted located at the most negative value for the privacy ratings 404 compared to the other options. Similarly, the extreme sharing option 636 should be place preferably to avoid a cluster.

Figure 9:
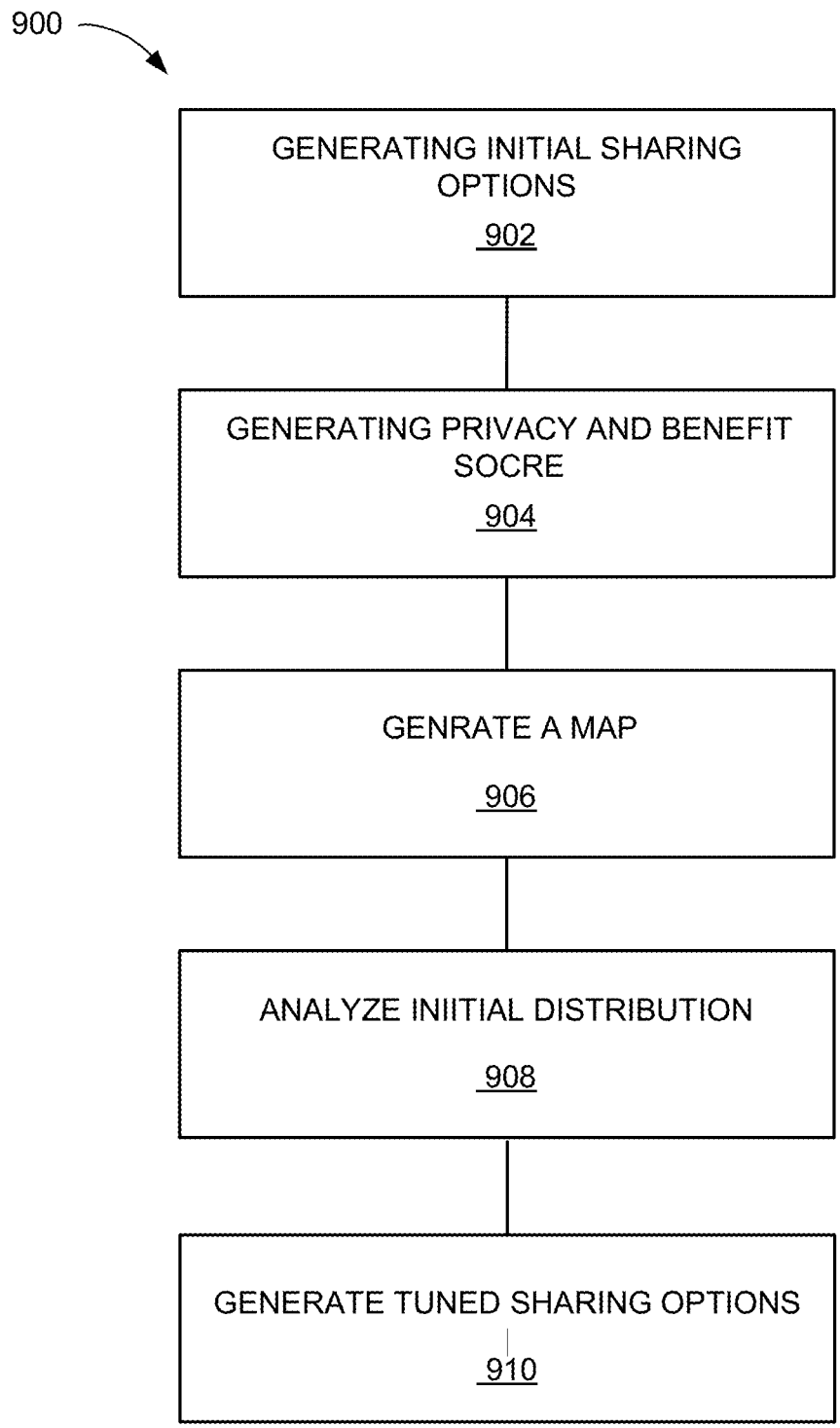
FIG. 9 is a flow chart of a method of operation of a computing system in a further embodiment of the present invention.

Referring now to FIG. 9, therein is shown a flow chart of a method 900 of operation of a computing system 100 in a further embodiment of the present invention. The method 900 includes: generating initial sharing options in a block 902; generating a privacy score and a benefit score with a control unit for one or more of the initial sharing options in a block 904; generating a map based on the initial sharing options, the privacy score, and the benefit score in a block 906; analyzing an initial distribution of the map in a block 908; and x generating tuned sharing options based on the distribution for displaying on a device in a block 910.

The physical transformation from the privacy score 418 and the benefit score 420 results in the movement in the physical world, such as determining the tuned sharing options 622 resulting in determining the amount of information to share with other and that subsequently can result in personalization of information sent the user. The personalization can further effect movement in the physical world as the first device 102, the second device 106, the user, or a combination thereof physically moved responded to the more personalized content. Movement in the physical world results in changes to the privacy score 418 and the benefit score 420 and potentially the tuned sharing options 622 by the increased effectiveness of the personalized information, which can lead to changes in the privacy score 418 and the benefit score 420 as well as the options available in the tuned sharing options 622.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
a control unit configured to:
generate initial sharing options,
generate a privacy score and a benefit score for one or more of the initial sharing options,
generate a map based on the initial sharing options, the privacy score, and the benefit score,
analyze an initial distribution of the map,
generate tuned sharing options based on the initial distribution, and
a communication interface, coupled to the control unit, configured to transmit the tuned sharing options for displaying on a device.

2. The system as claimed in claim 1 wherein the control unit is configured to add an extreme sharing option to increase the overall sharing of information and for displaying on the device.

3. The system as claimed in claim 1 wherein the control unit is configured to remove one or more of the initial sharing options when the remaining instances of the initial sharing options provide the privacy score or the benefit score better than the ones removed.

4. The system as claimed in claim 1 wherein the control unit is configured to remove one or more of the initial sharing options when the remaining instances of the initial sharing options are clustered to the ones removed.

5. The system as claimed in claim 1 wherein the control unit is configured to remove one or more of the initial sharing options when the remaining instances of the initial sharing options are more likely to be chosen.

6. The system as claimed in claim 1 wherein the control unit is configured to replace one or more of the initial sharing options with a preferred sharing option not part of the initial sharing options.

7. The system as claimed in claim 1 wherein the control unit is to:
determine a non-covered region in a tuned distribution for the tuned sharing options; and
generate a coverage option in the non-covered region.

8. The system as claimed in claim 1 wherein the control unit is configured to generate the initial sharing options based on a change in a context.

9. The system as claimed in claim 1 wherein the control unit is configured to generate the tuned sharing options based on a context.

10. The system as claimed in claim 1 wherein the control unit is to:
determine a non-covered region based on a context in a tuned distribution for the tuned sharing options; and
generate a coverage option in the non-covered region.

11. A method of operation of a computing system comprising:
generating initial sharing options;
generating a privacy score and a benefit score with a control unit for one or more of the initial sharing options;
generating a map based on the initial sharing options, the privacy score, and the benefit score;
analyzing an initial distribution of the map; and
generating tuned sharing options based on the initial distribution for displaying on a device.

12. The method as claimed in claim 11 further comprising adding an extreme sharing option to increase the overall sharing of information and for displaying on the device.

13. The method as claimed in claim 11 wherein generating the tuned sharing options includes removing one or more of the initial sharing options when the remaining instances of the initial sharing options provide the privacy score or the benefit score better than the ones removed.

14. The method as claimed in claim 11 wherein generating the tuned sharing includes removing one or more of the initial sharing options when the remaining instances of the initial sharing options are clustered to the ones removed.

15. The method as claimed in claim 11 wherein generating the tuned sharing options includes removing one or more of the initial sharing options when the remaining instances of the initial sharing options are more likely to be chosen.

16. The method as claimed in claim 11 wherein generating the tuned sharing options includes replacing one or more of the initial sharing options with a preferred sharing option not part of the initial sharing options.

17. The method as claimed in claim 11 further comprising:
determining a non-covered region in a tuned distribution for the tuned sharing options; and
generating a coverage option in the non-covered region.

18. The method as claimed in claim 11 wherein generating the initial sharing options can include generating the initial sharing options based on a context.

19. The method as claimed in claim 11 wherein generating the tuned sharing options includes generating the tuned sharing options based on a change in a context.

20. The method as claimed in claim 11 further comprising:
determining a non-covered region based on a context in a tuned distribution for the tuned sharing options; and
generating a coverage option in the non-covered region.

21. A non-transitory computer readable medium comprising:
generating a privacy score and a benefit score with a control unit for one or more of the initial sharing options;
generating a map based on the initial sharing options, the privacy score, and the benefit score;
analyzing an initial distribution of the map; and
generating tuned sharing options based on the initial distribution for displaying on a device.

22. The non-transitory computer readable medium as claimed in claim 21 further comprising adding an extreme sharing option to increase the overall sharing of information and for displaying on the device.

23. The non-transitory computer readable medium as claimed in claim 21 wherein generating the tuned sharing options includes removing one or more of the initial sharing options when the remaining instances of the initial sharing options provide the privacy score or the benefit score better than the ones removed.

24. The non-transitory computer readable medium as claimed in claim 21 wherein generating the tuned sharing options includes removing one or more of the initial sharing options when the remaining instances of the initial sharing options are clustered to the ones removed.

25. The non-transitory computer readable medium as claimed in claim 21 wherein generating the tuned sharing options includes removing one or more of the initial sharing options when the remaining instances of the initial sharing options are more likely to be chosen.

26. The non-transitory computer readable medium as claimed in claim 21 wherein generating the tuned sharing options includes replacing one or more of the initial sharing options with a preferred sharing option not part of the initial sharing options.

27. The non-transitory computer readable medium as claimed in claim 21 further comprising:
determining a non-covered region in a tuned distribution for the tuned sharing options; and
generating a coverage option in the non-covered region.

28. The non-transitory computer readable medium as claimed in claim 21 wherein generating the initial sharing options can include generating the initial sharing options based on a context.

29. The non-transitory computer readable medium as claimed in claim 21 wherein generating the tuned sharing options includes generating the tuned sharing options based on a change in a context.

30. The non-transitory computer readable medium as claimed in claim 21 further comprising:
determining a non-covered region based on a context in a tuned distribution for the tuned sharing options; and
generating a coverage option in the non-covered region.

\* \* \* \* \*